United States Patent
Gunnarsson et al.

(10) Patent No.: US 11,234,206 B2
(45) Date of Patent: Jan. 25, 2022

(54) WIRELESS DEVICE, A CORE NETWORK NODE AND METHODS THEREIN

(71) Applicant: Telefonaktiebolaget LM Ericsson (publ), Stockholm (SE)

(72) Inventors: Fredrik Gunnarsson, Linköping (SE); Gino Masini, Stockholm (SE); Sara Modarres Razavi, Linköping (SE); Henrik Rydén, Solna (SE); Iana Siomina, Täby (SE); Kai-Erik Sunell, Antibes (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 25 days.

(21) Appl. No.: 16/334,070

(22) PCT Filed: Sep. 13, 2017

(86) PCT No.: PCT/SE2017/050898
§ 371 (c)(1),
(2) Date: Mar. 18, 2019

(87) PCT Pub. No.: WO2018/063053
PCT Pub. Date: Apr. 5, 2018

(65) Prior Publication Data
US 2019/0274111 A1     Sep. 5, 2019

Related U.S. Application Data

(60) Provisional application No. 62/401,925, filed on Sep. 30, 2016.

(51) Int. Cl.
*H04W 64/00*     (2009.01)
*G01S 5/02*      (2010.01)
(Continued)

(52) U.S. Cl.
CPC .......... *H04W 64/00* (2013.01); *G01S 1/00* (2013.01); *G01S 5/0236* (2013.01); *G01S 5/10* (2013.01)

(58) Field of Classification Search
CPC ........ H04W 64/00; G01S 1/00; G01S 5/0236; G01S 5/10
(Continued)

(56) References Cited

U.S. PATENT DOCUMENTS 9,137,770 B2 * 9/2015 Edge ............... H04W 64/00
9,829,560 B2 * 11/2017 Moshfeghi .......... H04W 64/006
(Continued)

FOREIGN PATENT DOCUMENTS

WO     2015178830 A1     11/2015

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 13)", 3GPP TS 36.355 V13.2.0, Sep. 2016, 1-141.

*Primary Examiner* — Charles N Appiah
*Assistant Examiner* — Frank E Donado
(74) *Attorney, Agent, or Firm* — Murphy, Bilak & Homilier, PLLC

(57) ABSTRACT

A core network node (302) and a method therein. The core network node, a transmission point (308,312) and a wireless device (310) operate in a wireless communications network (300). The core network node manages at least one set of transmission points, wherein each transmission point is associated with a respective index. Further, the core network node receives, from the wireless device, measurement information and an index, and maps the measurement information to a transmission point based on the received index and
(Continued)

Method performed by the network node 302,308 an association, which association associates a transmission point to an index that is unique for the wireless device.

16 Claims, 8 Drawing Sheets

(51) Int. Cl.
    *G01S 1/00*       (2006.01)
    *G01S 5/10*       (2006.01)

(58) Field of Classification Search
    USPC .................................................... 455/456.1
    See application file for complete search history.

(56) References Cited

U.S. PATENT DOCUMENTS

| | | | |
|---|---|---|---|
| 2013/0039342 A1* | 2/2013 | Kazmi | H04W 48/16 370/331 |
| 2013/0051317 A1 | 2/2013 | Ji et al. | |
| 2015/0011254 A1* | 1/2015 | Chande | H04W 52/24 455/522 |
| 2015/0223027 A1* | 8/2015 | Ahn | G01S 5/0236 455/456.1 |
| 2015/0365790 A1* | 12/2015 | Edge | H04W 4/90 455/404.2 |
| 2016/0109582 A1* | 4/2016 | Sendonaris | G01S 19/10 455/456.1 |
| 2016/0205499 A1* | 7/2016 | Davydov | G01S 1/20 455/456.1 |
| 2016/0234645 A1* | 8/2016 | Belghoul | G01C 5/06 |
| 2018/0227812 A1* | 8/2018 | Nagasaka | H04W 88/06 |

* cited by examiner

Fig. 4 Method performed by the wireless device 310

Fig. 5 Method performed by the wireless device 310

Fig. 7 Method performed by the network node 302,308

Fig. 8 Method performed by the network node 302,308

WIRELESS DEVICE, A CORE NETWORK NODE AND METHODS THEREIN

TECHNICAL FIELD

Embodiments herein relate to a wireless device, a core network node and methods therein. Especially, embodiments herein relate to index based reporting and mapping of measurement information to a transmission point.

BACKGROUND

Communication devices such as terminals or wireless devices are also known as e.g. User Equipments (UEs), mobile terminals, wireless terminals and/or mobile stations, and in this disclosure those terms may be used interchangeably. Further, such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Location-based services and emergency call positioning drive the development of positioning in wireless communication networks. Positioning support in the Third Generation Partnership Project Long Term Evolution (3GPP LTE) communications networks was introduced in Release 9. This enables operators to retrieve position information for location-based services and to meet regulatory emergency call positioning requirements.

Positioning in LTE is supported by the architecture illustrated in FIG. 1, wherein direct interactions between a UE and a location server E-SM LC are performed via a LTE Positioning Protocol (LPP). Moreover, there are also interactions between the location server and an eNodeB via an LPPa protocol, to some extent supported by interactions between the eNodeB and the UE via a Radio Resource Control (RRC) protocol.

The following four positioning techniques are considered in LTE:

Enhanced Cell ID.

Essentially cell ID information is used to associate the UE to the serving area of a serving cell, and then additional information to determine a finer granularity position may be used.

Assisted Global Navigation Satellite System (AGNSS).

GNSS information retrieved by the UE, supported by assistance information provided to the UE from the location server, e.g. the E-SM LC, is used for positioning of the UE.

Observed Time Difference of Arrival (OTDOA).

The UE estimates the time difference of reference signals from different base stations and sends to the location server, e.g. the E-SM LC, for multilateration and determination of the position of the UE.

Uplink TDOA (UTDOA).

The UE is requested to transmit a specific waveform that is detected by multiple location measurement units, e.g. eNBs, located at known positions. These measurements are forwarded to the location server, e.g. the E-SM LC, for multilateration and determination of the position of the UE.

The OTDOA has been introduced in the 3GPP release 9 as a downlink (DL) positioning method. As illustrated in FIG. 2, the OTDOA in LTE is based on the UE measuring the Time of Arrival (TOA) of signals received from several eNBs. The UE is assisted via assistance data comprising information about Positioning Reference Signals (PRS) that could be detected by the UE. The assistance data is transmitted from the location server to the UE. Further, the UE measures the relative difference between the reference cell and another specific cell, defined as Reference Signal Time Difference (RSTD) measurement. Each such RSTD measurement determines a hyperbola and the intersection point of these hyperbolas may be considered as the UE's position. Here, the reference cell is selected by the UE and the RSTD measurement may be performed on an intra-frequency cell, e.g. a reference cell or a neighbour cell that is on the same carrier frequency as the serving cell, or the RSTD measurement may be performed on an inter-frequency cell, e.g. at least one of the reference cell and the neighbour cell is on a different carrier frequency as the serving cell.

In the current the 3GPP TS 36.355 specification, each cell, e.g. a reference cell or a neighbour cell, is included in the list of candidate cells in the assistance data. Each cell in the candidate list is identified by its Physical Cell Identity (PCI) and optionally by the globally unique cell identity.

Recent advances address the issues occurring when the same PCI is used for several Transmission Points (TPs). This may typically be the case when a combined cell comprises multiple TPs, as well as in the case of a Terrestrial Beacon System (TBS) based on positioning reference signals.

The same PCI issue means that it is desirable to be able to separate two different TPs from each other when both of them are configured to transmit the same PCI. In LTE releases prior to Rel. 14, the Positioning Reference Signal (PRS) from a cell was generated based on the PCI. However, since the LTE Rel. 14, it is possible to assign PRSs that are not generated based on the PCI, or to separate the same PRS via mutually orthogonal muting patterns.

The PRS-based TBS means that it is possible to define beacons that essentially only transmit a PRS, which may be used for positioning of the UE. In one example, these beacons operate in a dedicated carrier, where no other signals than PRS are transmitted.

SUMMARY

An aim of some embodiments disclosed herein is to overcome or mitigate at least some of the drawbacks with the prior art.

Therefore, an object of some embodiments disclosed herein is to enable a compact representation of assistance data and signal measurement information exchanged between a wireless device and a network node, such as a core network node, e.g. a location server, while enabling an indication of which cells, e.g. Radio Network Nodes, that may be used for synchronization, and while supporting transmission points, e.g. one or more Radio Network Nodes (RNNs), that may not be associated with a Physical Cell Identity. The signal measurement information, sometimes herein referred to as just measurement information, may comprise a result of a measurement performed on a signal and an uncertainty estimation on the measurement. The measurement may be performed by the wireless device and/or the network node. Further, the uncertainty estimation may depend on the wireless device and/or the network node performing the measurement. Thus, the uncertainty estimation may be specific for the wireless device or the network node, and may vary depending on type of wireless device or network node etc.

According to an aspect of embodiments herein, the object is achieved by a method performed by a wireless device. The wireless device, a core network node and a transmission point are operating in the wireless communications network.

The wireless device obtains at least one set of transmission points, e.g. RNNs, to monitor for positioning reference signals, i.e. to monitor one or more signals transmitted from one or more transmission points of the list for positioning purpose. Each transmission point is associated with an index.

The wireless device obtains measurement information relating to a positioning reference signal transmitted from one transmission point out of the at least one set of transmission points and reports, to the core network node, the measurement information and the index associated with the one transmission point to enable the core network node to map the measurement information to the transmission point.

According to another aspect of embodiments herein, the object is achieved by a wireless device. The wireless device, a core network node, and a transmission point are configured to operate in the wireless communications network.

The wireless device is configured to obtain at least one set of transmission points, e.g. RNNs, to monitor for positioning reference signals, i.e. to monitor one or more signals transmitted from one or more transmission points of the list for positioning purpose. Each transmission point is associated with an index.

The wireless device may be configured to obtain measurement information relating to a positioning reference signal transmitted from one transmission point out of the at least one set of transmission points and report, to the core network node, the measurement information and the index associated with the transmission point to enable the core network node to map the measurement information to the transmission point.

According to another aspect of embodiments herein, the object is achieved by a method performed by a core network node. The core network node, a transmission point and a wireless device operates in the wireless communications network.

The core network node manages at least one set of transmission points, wherein each transmission point is associated with a respective index.

The core network node receives, from the wireless device, measurement information and an index, and maps the measurement information to a transmission point based on the received index and a transmission point association to an index, which association associates the transmission point to an index that is unique for the wireless device.

By the expression "transmission point association to an index" when used in this disclosures is meant that the wireless device has obtained configurations of a set of transmission points, each transmission point is associated to an index that is unique to the wireless device. When reporting measurements to the network node, each measurement is reported with an index, and thereby the network node is able map the measurement to the transmission point using the index.

Different terms may be used for the index association in the assistance data and in the measurement report, and then the term 'map' may be used to describe the activity in the network node, e.g. in the core network node, where the measurements are mapped to the correct transmission point.

Thus, by the expression "map the measurement information to the transmission point" and similar when used in this disclosure is meant that there is a relationship between the measurement information and the transmission point, and that the relationship is determined by the core network node by means of the index transmitted by the wireless device to the core network node and by means of the association of the index to a specific transmission point, which association is known to the core network node.

According to another aspect of embodiments herein, the object is achieved by a core network node. The core network node, a transmission point and a wireless device operates in the wireless communications network.

The core network node is configured to manage at least one set of transmission points, wherein each transmission point is associated with a respective index.

The core network node is configured to receive, from the wireless device, measurement information and an index, and configured to map the measurement information to a transmission point based on the received index and a transmission point association to an index, which association associates a transmission point to an index that is unique for the wireless device.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a computer program, comprising instructions which, when executed on at least one processor, causes the at least one processor to carry out the method performed by the core network node.

According to another aspect of embodiments herein, the object is achieved by a carrier comprising the computer program, wherein the carrier is one of an electronic signal, an optical signal, a radio signal or a computer readable storage medium.

Since reports and data transmitted between the wireless device and the core network node are index based, the needed signalling in order to differentiate between different transmission points is reduced. This results in an improved performance in the wireless communications network.

An advantage with embodiments herein is that the indexed based assistance data and signal measurement reporting provides support for a differentiation between different Transmission Points (TPs), e.g. between different RNNs, in a compact manner with few bits to represent an index that is only shared between the location server and the wireless device, i.e. global uniqueness is not needed. The use of two lists also enables the possibility to separate TPs that are able to support retrieval of synchronization from TPs that are not able to support retrieval of synchronization.

BRIEF DESCRIPTION OF DRAWINGS

Examples of embodiments herein will be described in more detail with reference to attached drawings in which.

DETAILED DESCRIPTION

Figure 1:
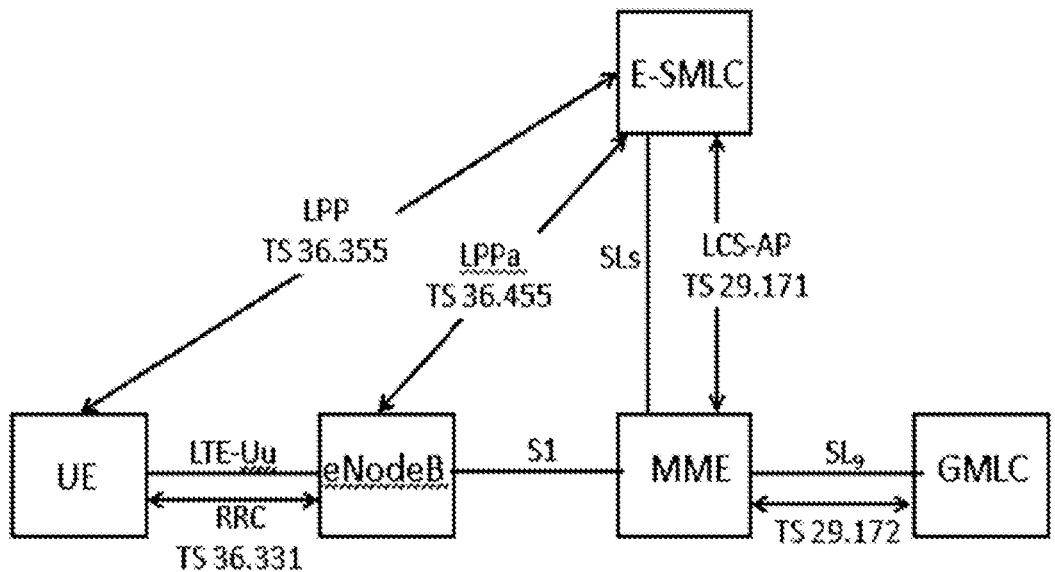
FIG. 1 schematically illustrates an LTE positioning architecture according to prior art.
Figure 2:
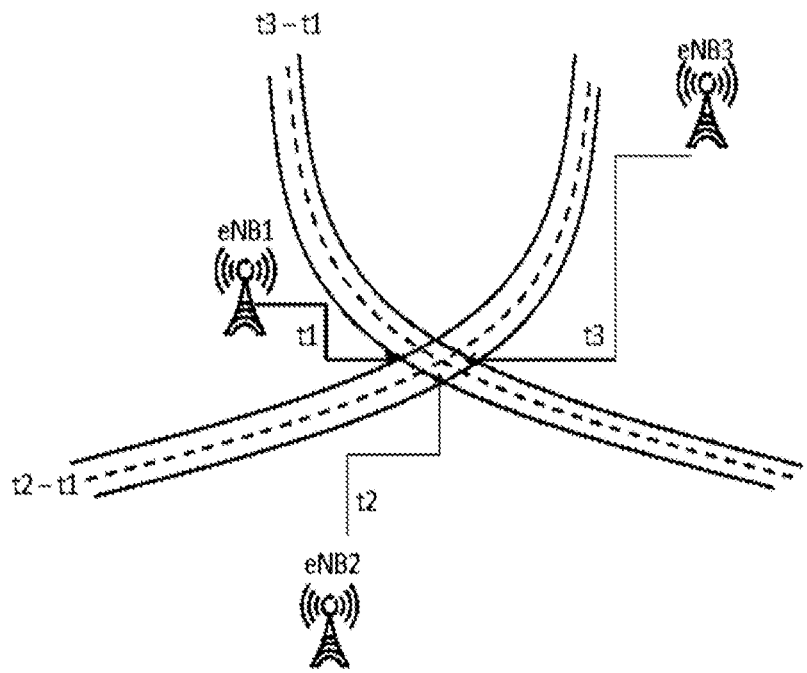
FIG. 2 schematically illustrates OTDOA positioning estimation based on multi-lateration of RSTD measurements according to prior art.

As part of developing embodiments herein, some drawbacks with the state of the art communications networks will first be identified and discussed.

A first drawback with the prior art is that the PCI is used to identify both the transmission point and the associated measurement. However, when multiple adjacent transmission points share the same PCI, it is not possible to identify both the transmission point and the associated measurement based on the PCI. Further, for PRS-based TBS where the transmission points are not assigned any PCI it is neither possible to identify both the transmission point and the associated measurement since the PCI(s) are lacking.

A second drawback with the prior art is that if the transmission points would be assigned a unique identifier, either from a dedicated range of unique identifiers or from a hierarchy of unique identifiers under a PCI, then this would require a considerable number of bits only to represent the identifier in the messages.

A third drawback with the prior art is that it is not possible to indicate to the wireless device which of the cells listed in the assistance data that may be used to retrieve synchronization. For example, that is not possible with PRS-based TBS beacons since these only transmit PRSs and not synchronization signals.

An object addressed by embodiments herein is therefore how to improve performance in a wireless communications network.

Therefore, as mentioned above, according to embodiments herein, a way of improving the performance in the wireless communications network is provided.

According to developments of wireless communications networks index based reporting, such as Observed Time Difference Of Arrival (OTDOA) index based reporting, is needed for improving the performance of the wireless communications network.

By the expression "index based reporting" when used in this disclosure is meant that transmitters, e.g. transmitting points, of positioning reference signals are identified by an index which is defined by the network node, e.g. the core network node such as the location server, and associated with elements in the assistance data to the wireless device, and which index the wireless device is using to identify measurements in the signal measurement information to the network node, e.g. the core network node such as the location server. The indices are unique for each element in the assistance data to a specific wireless device, but may be different in the agreement between the network node, e.g. the core network node such as the location server, and a different wireless device.

Therefore, an object of embodiments herein is to overcome some drawbacks of the prior art and to improve the performance in a wireless communications system. For example, an object of embodiments herein is to provide index based reporting, such as Observed Time Difference Of Arrival (OTDOA) index based reporting, and a mapping of measurement information to a transmission point.

In some embodiments herein multiple lists of transmission points are provided in assistance data transmitted from the network node, such as the core network node e.g. the location server to the wireless device and/or in signal measurements information transmitted from the wireless device to the network node, e.g. the core network node.

In this disclosure reference is sometimes made to a "list of transmission points". However, the expression "list of transmission points" should be understood to refer to a number or set of transmission points even if not arranged in a list. Thus, a first list of transmission points may be referred to as a first number of transmission points or a first set of transmissions points.

Terminology

The following terminology is used in embodiments described herein and is elaborated below:

Network Node:

In some embodiments a more general term "network node" is used and it may correspond to any type of radio network node or any network node, which communicates with a wireless device and/or with another network node. Examples of network nodes are NodeB, MeNB, SeNB, a network node belonging to a Master Cell Group (MCG) or a Secondary Cell Group (SCG), Base Station (BS), Multi-Standard Radio (MSR) radio node such as MSR BS, eNodeB, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), core network node (e.g. Mobile Switching Center (MSC), Mobility Management Entity (MME) etc.), Operations and Maintenance (O&M), Operations Support System (OSS), Self-Organizing Network (SON), positioning node (e.g. Enhanced Serving Mobile Location Center (E-SMLC)), Mobile Data Terminal (MDT) etc.

User Equipment/Wireless Device:

In some embodiments the non-limiting terms wireless device, wireless communications device, Mobile Station (MS) and User Equipment (UE) are used and they refer to any type of wireless device communicating with a network node and/or with another wireless device in a cellular or mobile communication system. Examples of UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles, Customer Premises Equipment (CPE) etc. In this disclosure the terms wireless device and UE are used interchangeably.

Note that although terminology from Global System for Mobile Communications (GSM) is used in this disclosure to exemplify the embodiments herein, this should not be seen as limiting the scope of the embodiments herein to only the aforementioned system. Other wireless systems, such as for example a 5G network, an LTE network, a Wideband Code Division Multiple Access (WCDMA) network, a Global System for Mobile Communications (GSM) network, any 3GPP cellular network, e.g. any 3GPP cellular network comprising a Terrestrial Beacon System (TBS), a Worldwide Interoperability for Microwave Access (WMAX) network, a Wireless Local Area Network (VVLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 3:
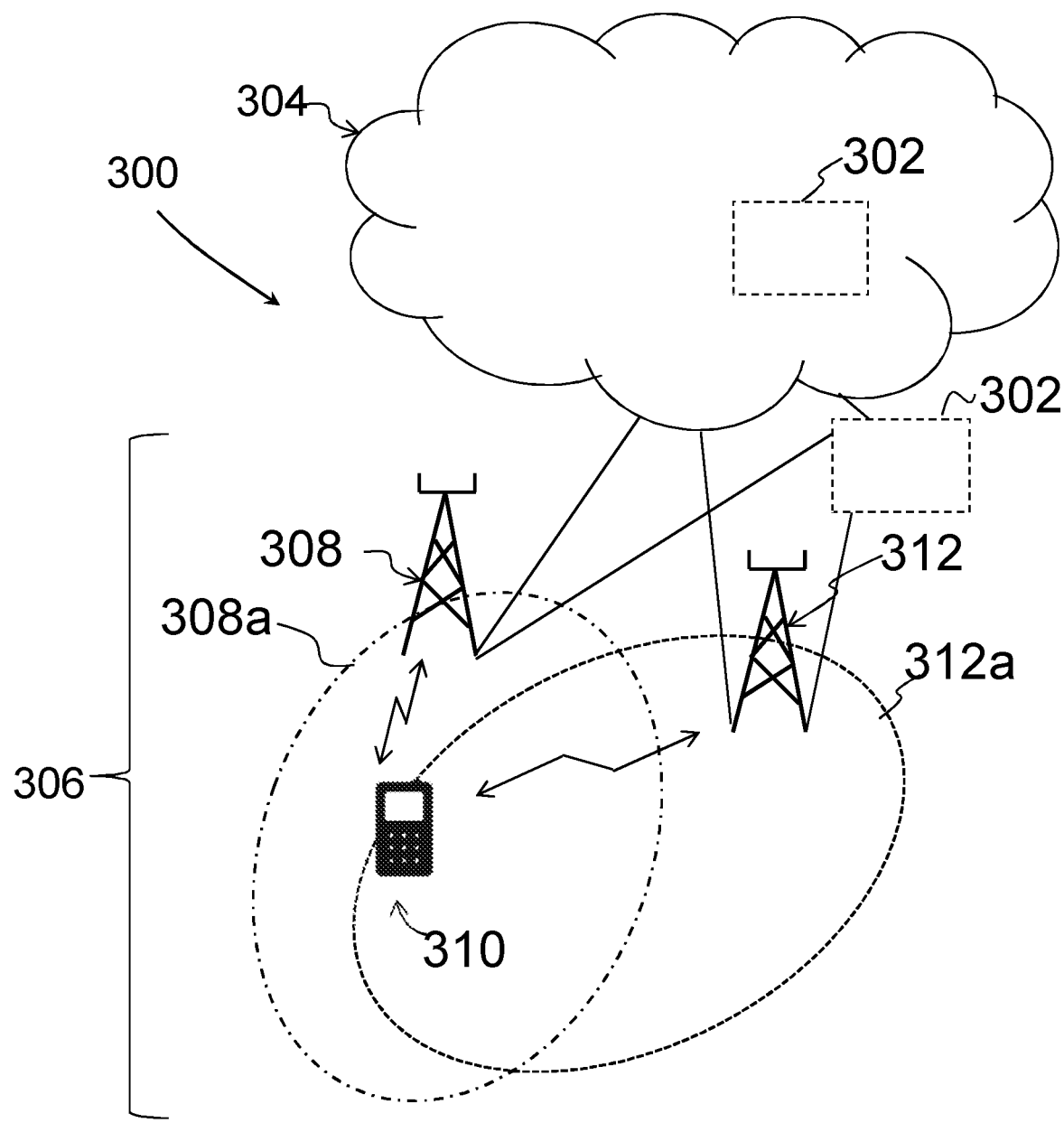
FIG. 3 schematically illustrates embodiments of a wireless communications system.

FIG. 3 depicts an example of the wireless communications network 300 in which embodiments herein may be implemented. The wireless communications network 300 may be a cellular communications network such as a 5G network, an LTE network, a WCDMA network, a GSM network, any 3GPP cellular network, e.g. any 3GPP cellular network comprising a Terrestrial Beacon System (TBS), or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

One or more network nodes 302,308 operate in the wireless communications network 300.

In some embodiments, one out of the one or more network nodes 302,308 is a core network node 302 operating in a core network 304 of the wireless communications network 300. The core network node 302 may be a location server such as a Serving Mobile Location Center (SMLC), an enhanced SMLC (eSMLC), a Mobile Switching Center (MSC), a Mobility Management Entity (MME), an Operation & Maintenance (O&M) node, a Serving GateWay (S-GW), a Serving General Packet Radio Service (GPRS) Node (SGSN), etc. Further, the core network may be a wireless core network such as a GERAN core network, an LTE core network, e.g. a Evolved Packet Core (EPC); a WCDMA core network; a GSM core network; any 3GPP core network; WiMAX core network; or any wireless or cellular core network.

In some embodiments, one out of the one or more network nodes 302,308 is a Radio Network Node (RNN) 308 operating in e.g. a wireless access network 306. The RNN may be a Transmission Point (TP), an Access Point (AP), a radio access node such as a Base Transceiver Station (BTS), a radio base station, for example an eNB, an eNodeB, or a Home Node B, an Home eNode B or any other network node capable to serve a user equipment or a machine type communication device in a wireless communications network. A key characteristics of the RNN is that it is a transmitter of a positioning reference signal, configured with transmission occasions in time and frequency. Further, the wireless access network may sometimes be referred to as a Radio Access network (RAN). Further, the wireless access network 306 may be a wireless access network such as a GERAN network, an LTE access network, e.g. an Evolved UMTS Terrestrial Radio Access Network (E-UTRAN); a WCDMA communications network; a GSM communications network; any 3GPP communications network; WiMAX communications network; or any wireless or cellular communications network. Furthermore, it should be understood that in some embodiments the core network and the wireless access network are combined into one single network or that the wireless access network may comprise the core network.

In some embodiments, the RNN 308 may be configured for wireless communication with one or more wireless devices, such as a wireless device 310, when the wireless device is located within the coverage area 308a. Herein, this is also specified as the RNN 308 manages or is configured to manage communication with one or more wireless devices in the coverage area 308a. In this disclosure, the coverage area 308a is sometimes referred to as a cluster or a cell. Further, when the wireless device 310 is located within the coverage area 308a and is served by the RNN 308 serving the coverage area 308a, the coverage area 308a may be referred to as a serving cell, or a serving cluster. It should be understood that more than one RNN 308 may be operating in the wireless communications network 300. For example, one or more neighboring RNNs 312 may operate in the wireless communications network 300, and each of the one or more neighboring RNNs 312 may be configured to serve a respective coverage area 312a. Furthermore, it should be understood that one RNN may be configured to serve several coverage areas, e.g. several cells.

Furthermore, in this disclosure, any reference to one or more cells is understood to equally refer to one or more transmission points, such as one or more RNNs, e.g. the RNNs 308, or one or more neighbouring RNNs 312 serving or managing the respective cell, e.g. the cell 308a or the one or more neighbouring cells 312a.

Sometimes in this disclosure the term transmission point 308,312 is used to refer to one of more of the RNN 308 and the neighboring RNN 312. Further, the term transmission point 308,312 may be used to refer to a transmission point, e.g. RNN 308,312, in a Terrestrial Beacon System (TBS), such as a PRS-based TBS.

It should be understood, that two or more transmission points, e.g. two or more RNNs, may be transmitting the same signal, but at mutually exclusive occasions in time and/or in frequency and are therefore considered as different transmission points and separable by the wireless device. The capability of being able to separate transmission points by mutually exclusive occasions may be provided by the wireless device to the network node. Such two or more transmission points are assigned different indices in the assistance data. Thus, the wireless device may provide, to the network node, an indication of its capability of being able to separate transmission points by mutually exclusive occasions.

A wireless device 310 is operating in the wireless communications network 300. The wireless device 310, also sometimes referred to as a wireless communications device, a user equipment, a UE, a mobile station or an MS, is located in the wireless communications network 300. The wireless device 310 may e.g. be a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the wireless device 310 is a stationary wireless device. Thus, the wireless device 310 is sometimes in this disclosure referred to as a stationary wireless device 310. By the expression "stationary wireless device" when used herein is meant that the wireless device 310 is not moving. For example, the stationary wireless device is not moving when in use, e.g. during operation.

An example of a method performed by the wireless device 310 will now be described with reference to a flowchart depicted in FIG. 4. The method relates to index based reporting and/or index based transmission of data in the wireless communications network 300. As mentioned above, the wireless device 310, the core network node 302 and the transmission point 308,312 operate in the wireless communications network 300.

The methods comprise one or more of the following actions. It should be understood that these actions may be taken in any suitable order and that some actions may be combined.

Action 401

In some embodiments, the wireless device 310 informs the network node 302,308, e.g. the core network node 302, that it supports index based reporting. Thereby, the core network node 302 will receive knowledge about the wireless device's ability of supporting index based reporting and thus the core network node 302 may transmit, to the wireless device 310, assistance data in a compact way using index and may receive measurement information transmitted from the wireless device 310 in a compact way using index.

For example, the wireless device 310 may provide, e.g. transmit, a capability to the network node, which capability indicates that the wireless device 310 supports index based reporting. As previously mentioned, the wireless device 310 and the core network node 302 may communicate with each other using the LTE Positioning Protocol (LPP).

Further, as also mentioned above, two or more transmission points 308,312, e.g. two or more RNNs 308,312, may be transmitting the same signal, but at mutually exclusive occasions in time and/or in frequency and are therefore considered as different transmission points and separable by the wireless device. The capability of being able to separate transmission points by mutually exclusive occasions may be provided by the wireless device 310 to the network node, e.g. the core network node 302. Such two or more transmission points are assigned different indices in the assistance data. Thus, the wireless device 310 may transmit, to the core network node 302, an indication of its capability of being able to separate transmission points 308,312 by mutually exclusive occasions. By the expression "being able to separate transmission points 308,312 transmitting the same signal but at mutually exclusive occasions in time and/or frequency" when used in this disclosure is meant that the wireless device 310 is able to identify the transmission points 308,312 transmitting the same signal but at mutually exclusive occasions in time and/or frequency.

Action 402

In order to obtain information about one or more transmission points 308,312 to monitor for positioning purposes, the wireless device 310 obtains, e.g. from the core network node 302, first and second sets of one or more transmission points 308,312. The wireless device 310 may receive the first and seconds sets from the core network node 302. Further, the one or more transmission points 308,312 may be one or more out of the RNN 308 and one and more neighboring RNNs 312. Thus, the wireless device 310 is to monitor signals transmitted from the one or more transmission points 308,312, e.g. from one or more out of the RNN 308 and one and more neighboring RNNs 312, for positioning, e.g. for OTDOA based positioning. That is, the wireless device 310 is to monitor and measure the time of arrival of signals received from the one or more transmissions points 308,312. Further, as previously mentioned, the wireless device 310 receives, e.g. from the core network node 302, assistance data comprising information about Positioning Reference Signals (PRS) that may be detected by the wireless device 310. Based on measurements performed on the relative difference between PRSs from a reference cell and from one or more specific cells, the position of the wireless device 310 may be determined.

Action 403

Sometimes the wireless device 310 needs to know which transmission points 308,312 are available for synchronization. Therefore, and in some embodiments, the wireless device 310 discloses and/or determines that transmission points 308,312 of the first set of transmission points supports retrieval of synchronization information. In other words, the wireless device 310 may determine that the first set comprises, e.g. comprises only, transmission points that support retrieval of synchronization information. Thus, the transmission points 308,312 of the first set of transmission points are available for synchronization.

Action 404

In some embodiments, the wireless device 310 obtains synchronization with a transmission point 308,312 from the first set based on a signal received from the transmission point. This means that the wireless device 310 based on the received signal from the transmission point 308,312, e.g. from the RNN 308 or from one of the one or more neighboring RNNs 312, synchronizes to that transmission point. The term synchronization comprises one or more out of:

synchronization in frequency to align with transmission in a specific frequency carrier;

synchronization in time with respect to subframes to identify the start of a subframe;

synchronization in time with respect to frames to identify the start of a frame such as a radio frame or system frame. This may also comprise identification of a system frame number, identifying the frame in a set of frames; and synchronization in time with respect to absolute time.

Figure 5:
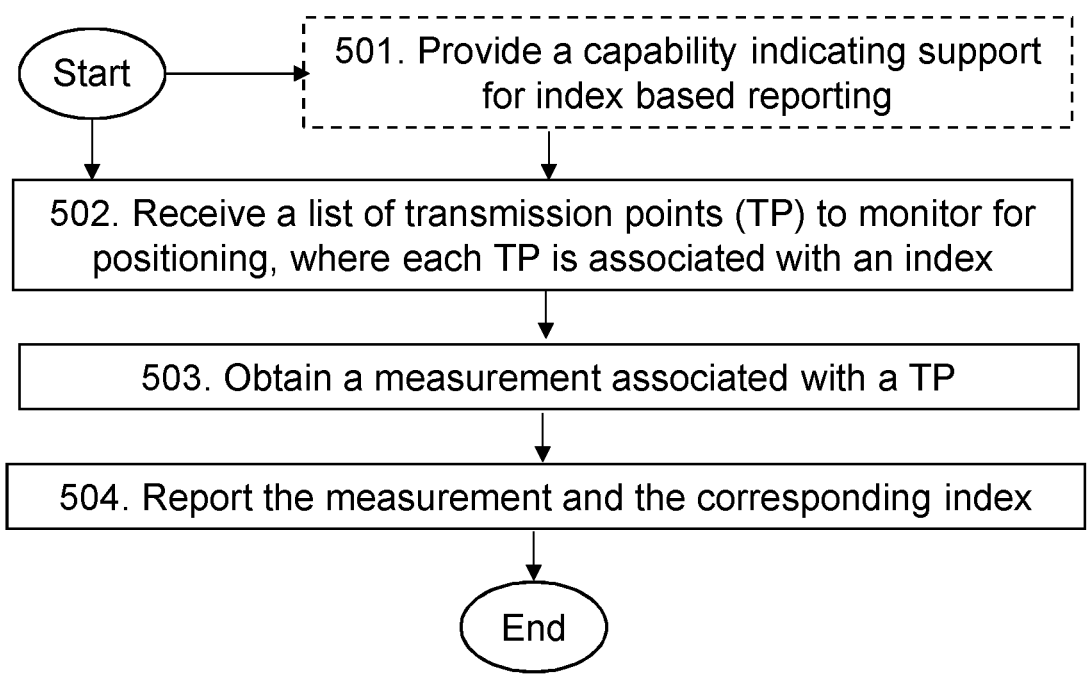
FIG. 5 is a flowchart depicting embodiments of a method performed by a wireless device.

An example of a method performed by the wireless device 310 will now be described with reference to a flowchart depicted in FIG. 5. The method relates to index based reporting and/or index based transmission of data in the wireless communications network 300. As mentioned above, the wireless device 310, the core network node 302 and the transmission point 308,312 operate in the wireless communications network 300.

The methods comprise one or more of the following actions. It should be understood that these actions may be taken in any suitable order and that some actions may be combined. Further, one or more of Actions 501-504 described below may be combined with one or more of Actions 401-404 described above.

Action 501

In order to inform the core network node 302 about its ability of supporting index based reporting and of its capability of receiving assistance data in a compact way using index, the wireless device 310 may provide a capability indicating support for index based reporting. Thus, wireless device 310 provides an indication to the core network node 302, which indication indicates support for index based reporting of measurement information.

Further, the wireless device 310 may transmit, to the network node 302,308, e.g. the core network node 302, an indication of its capability of being able to separate transmission points by mutually exclusive occasions. Thus, the wireless device 310 may provide, to the core network node 302, an indication of its capability of being able to separate transmission points 308,312 transmitting the same signal but at mutually exclusive occasions in time and/or frequency. As previously mentioned, by the expression "being able to separate transmission points 308,312 transmitting the same signal but at mutually exclusive occasions in time and/or frequency" when used in this disclosure is meant that the wireless device 310 is able to identify the transmission points 308,312 transmitting the same signal but at mutually exclusive occasions in time and/or frequency.

In some embodiments, the respective index is only valid between the wireless device 310 and the core network node 302. In such embodiments, the wireless device 310 may receive, from the core network node 302, the respective index in assistance data.

For example, the respective index may be one or more out of:

a transmission point index unique for each transmission point 308,312 within a cell;

an index related to a beacon identity;

an index of a transmission point 308,312 within a cell, which transmission point 308,312 is capable of transmitting positioning reference signals;

a measurement index in the set of transmission points 308,312; and an identity used to generate a positioning signal from the transmission point 308,312, which identity is different from the cell identity.

Action 502

In order to know which one or more transmission points to monitor for positioning purposes, the wireless device 310 receives a list of transmission points, e.g. of one or more transmission points 308 and/or one or more neighbour transmission points 312, to monitor for positioning, where each transmission point is associated with an index. For example, the wireless device 310 obtains, from the core network node 302, at least one set of transmission points 308,312 to monitor for positioning reference signals, wherein each transmission point 308,312 is associated with a respective index.

The index reflects a numbering that is valid between a wireless device, e.g. the wireless device 310, and the core network node 302 such as the location server. The index is only valid in the communication between the network node 302, e.g. the location server, and the wireless device, e.g. the wireless device 310, and two different wireless devices may be assigned different indices to for the same transmission point as illustrated by the example that will be described below.

The wireless device 310 may also receive knowledge about a reference cell/TP with associated information. The reference cell, e.g. the reference transmission point, may be a serving cell, e.g. a serving transmission point. In some embodiments, the index is not explicitly included for the reference cell. Instead, the index 0 is reserved for the reference cell. It should be understood that the selection of reference cell determines how the wireless device calculates the RSTDs.

As mentioned above in relation to Action 402, the wireless device 310 may obtain the at least one set of transmission points 308,312 by obtaining, from the core network node 302, the first set of transmission points 308,312 and the second set of transmission points 308,312, wherein the first set of transmission points 308,312 comprises only transmission points 308,312 supporting retrieval of synchronization information. As mentioned above in relation to Actions 403 and 404, such embodiments may further comprise determining that the transmission points 308,312 of the first set of transmission points 308,312 support retrieval of synchronization information; and obtaining synchronization with a transmission point 308,312 in the first set of transmissions points 308,312 based on a signal transmitted from the transmission point 308,312.

Action 503

The wireless device 310 obtains a measurement associated to a transmission point. Thereby, the wireless device's 310 position in relation to the transmission point may be determined. For example, the wireless device 310 obtains measurement information relating to a positioning reference signal transmitted from one transmission point 308,312 out of the at least one set of transmission points 308,312.

Action 504

The wireless device 310 reports the measurement and the corresponding index to the network node 302,308. For example, the wireless device 310 reports, to the core network node 302, the measurement information and the index associated with the one transmission point 308,312 to enable the core network node 302 to map the measurement information to the transmission point 308,312. Thereby, the core network node 302 may determine the wireless device's 310 position in relation to the transmission point 308,312 to which the measurement information has been mapped.

Figure 6:
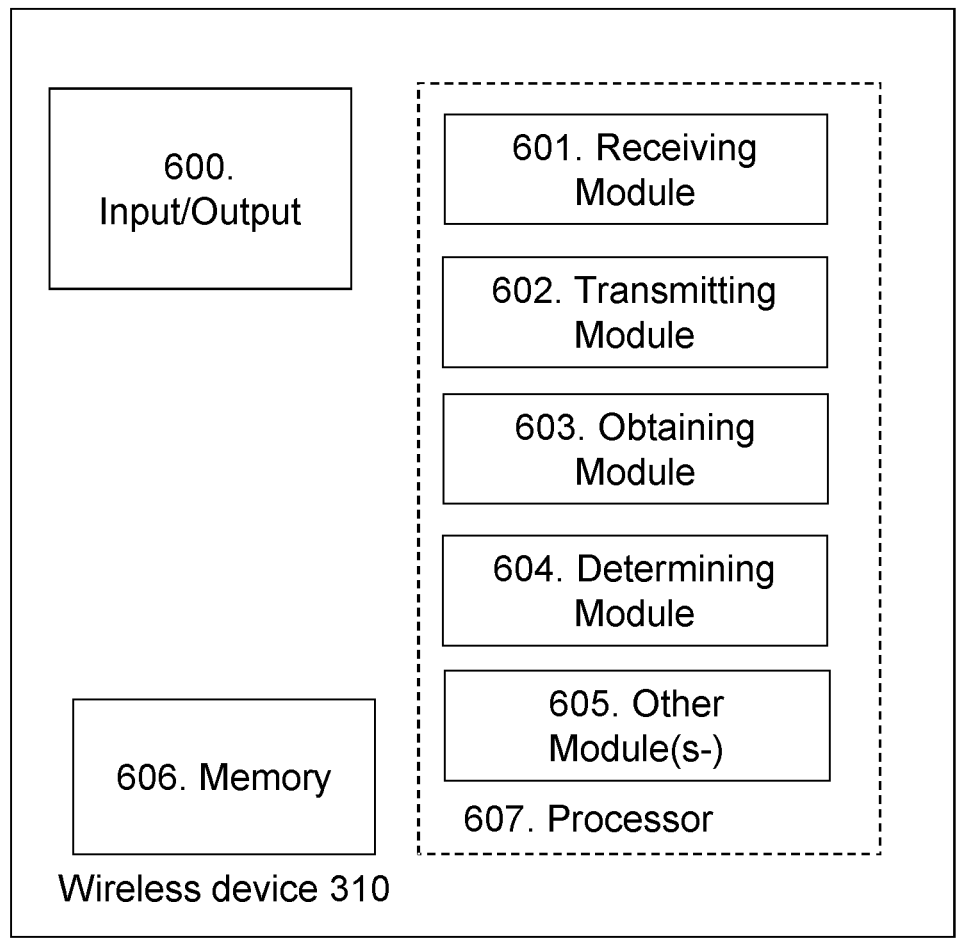
FIG. 6 is a schematic block diagram illustrating embodiments of a wireless device.

To perform the method in the wireless communications network, the wireless device 310 may be configured according to an arrangement depicted in FIG. 6. As previously described, the method relates to index based reporting and/or transmission of data. As also previously mentioned, the wireless device 310, the core network node 302 and the transmission point 308,312 is configured to operate in the wireless communications network 300.

In some embodiments, the wireless device 310 comprises an input and/or output interface 600 configured to communicate with one or more wireless devices, and/or one or more network nodes, e.g. the network node 302,308 such as the core network node 302. The input and/or output interface 600 may comprise a wireless receiver (not shown) and a wireless transmitter (not shown).

The wireless device 310 is configured to receive, e.g. by means of a receiving module 601 configured to receive, a transmission, e.g. a data packet, a signal or information, from one or more network nodes, e.g. the network node 302,308 such as the core network node 302 and/or from the transmission point 308,312 e.g. from the RNN 308 and/or from one or more neighbouring RNNs 312. The receiving module 601 may be implemented by or arranged in communication with a processor 607 of the wireless device 310. The processor 607 will be described in more detail below.

The wireless device 310 may be configured to receive, from the network node 302,308 such as the core network node 302, one or more sets of transmission points 308,312. The wireless device 310 may also be configured to obtain synchronization, e.g. by means of the receiving module 601, from the RNN 308 and/or from one or more neighbouring RNNs 312.

Further, the wireless device 310 may be configured to receive, from the core network node 302, a respective index associated with a respective transmission point 308,312. The wireless device 310 may receive the respective index in assistance data transmitted from the core network node 302.

The wireless device 310 is configured to transmit, e.g. by means of a transmitting module 602 configured to transmit, a transmission, e.g. a data packet, a signal or information, to one or more network nodes, e.g. the network node 302,308 such as the core network node 302 and/or to the transmission point 308,312, e.g. the RNN 308 and/or to one or more neighbouring RNNs 312. The transmitting module 602 may be implemented by or arranged in communication with the processor 607 of the wireless device 310.

The wireless device 310 may be configured to transmit, to the network node 302,308, such as the core network node 302, an indication indicating support for index based reporting. In other words, the wireless device 310 is configured to provide an indication to the core network node 302, which indication indicates support for index based reporting of measurement information.

Further, the wireless device 310 may be configured to transmit a report of measurement results for one or more transmission points 308,312 and the respective associated index. Thus, the wireless device 310 is configured to report, e.g. to transmit, to the core network node 302, the measurement information and the index associated with the one transmission point 308,312 to enable the core network node 302 to map the measurement information to the transmission point 308,312.

In some embodiments, the respective index is only valid between the wireless device 310 and the core network node 302.

The respective index may be one or more out of:
- a transmission point index unique for each transmission point 308,312 within a cell;
- an index related to a beacon identity;
- an index of a transmission point 308,312 within a cell, which transmission point 308,312 is capable of transmitting positioning reference signals;
- a measurement index in the set of transmission points 308,312; and
- an identity used to generate a positioning signal from the transmission point 308,312, which identity is different from the cell identity.

Furthermore, the wireless device 310 may transmit, to the network node 302,308 such as the core network node 302, an indication of its capability of being able to separate transmission points 308,312 by mutually exclusive occasions. In other words, the wireless device 310 may be configured to provide, to the core network node 302, an indication of the wireless device's 310 capability of being able to separate transmission points 308,312 transmitting the same signal but at mutually exclusive occasions in time and/or frequency. As previously mentioned, by the expression "being able to separate transmission points 308,312 transmitting the same signal but at mutually exclusive occasions in time and/or frequency" when used in this disclosure is meant that the wireless device 310 is configured to identify the transmission points 308,312 transmitting the same signal but at mutually exclusive occasions in time and/or frequency.

The wireless device 310 is configured to obtain, e.g. by means of an obtaining module 603 configured to obtain, one or more sets of transmission points and/or synchronization. The obtaining module 603 may be implemented by or arranged in communication with the processor 607 of the wireless device 310.

For example, the wireless device 310 obtains, e.g. from the network node 302,308 such as the core network node 302, first and second sets of one or more transmission points 308,312.

Thus, the wireless device 310 is configured to obtain, from the core network node 302, at least one set of transmission points 308,312 to monitor for positioning reference signals. As previously mentioned, each transmission point 308,312 is associated with a respective index that is unique for the wireless device 310 in communication with the core network node 302.

Further, the wireless device 310 is configured to obtain measurement information relating to a positioning reference signal transmitted from one transmission point 308,312 out of the at least one set of transmission points 308,312.

In some embodiments, the wireless device 310 is configured to obtain the at least one set of transmission points 308,312 by being configured to obtain, from the core network node 302, a first set of transmission points 308,312 and a second set of transmission points 308,312, wherein the first set of transmission points 308,312 comprises only transmission points 308,312 supporting retrieval of synchronization information. In such embodiments, the wireless device 310 may further be configured to determine that the transmission points 308,312 of the first set of transmission points 308,312 supports retrieval of synchronization information; and to obtain synchronization with a transmission point 308,312 in the first set of transmissions points 308,312 based on a signal transmitted from the transmission point 308,312.

The wireless device 310 is configured to determine, e.g. by means of a determining module 604 configured to determine, that transmissions points 308,312 of a set of transmissions points support retrieval of synchronization. The determining module 604 may be implemented by or arranged in communication with the processor 607 of the wireless device 310. The determining module 604 is sometimes in this disclosure referred to as a disclosing module configured to disclose that transmissions points of a list of transmissions points support retrieval of synchronization. In some embodiments, wherein the wireless device 310 is configured to obtain the at least one set of transmission points 308,312 by being configured to obtain the first set of transmission points 308,312 and the second set of transmission points 308,312, the wireless device 310 may further be configured to determine that the transmission points 308,312 of the first set of transmission points 308,312 support retrieval of synchronization information. Thus, the wireless device 310 may be configured to determine that the transmission points 308,312 of one of the sets of transmission points, e.g. the first set of transmission points 308,312, supports retrieval of synchronization information.

In some embodiments, the wireless device 310 is configured to perform, by means of one or more other modules 605 configured to perform one or more further actions described herein. The one or more other modules may be implemented by or arranged in communication with the processor 607 of the wireless device 310.

The wireless device 310 may also comprise means for storing data. In some embodiments, the wireless device 310 comprises a memory 606 configured to store the data. The data may be processed or non-processed data and/or information relating thereto. The memory 606 may comprise one or more memory units. Further, the memory 606 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 310.

Embodiments herein may be implemented through one or more processors, such as the processor 607 in the arrangement depicted in FIG. 6, together with computer program code for performing the functions and/or method actions of embodiments herein. Embodiments relate to index based reporting and/or transmission of data in the wireless communications network 300. The program code mentioned above may also be provided as a computer program product, for instance in the form of a data carrier carrying computer program code for performing the embodiments herein when being loaded into the wireless device 310. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 310.

Those skilled in the art will also appreciate that the input/output interface 600, the receiving module 601, the transmitting module 602, the obtaining module 603, the determining/disclosing module 604, and the one or more other modules 605 above may refer to a combination of analogue and digital circuits, and/or one or more processors configured with software and/or firmware, e.g. stored in the memory 606, that when executed by the one or more processors such as the processors in the wireless device 310 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 7:
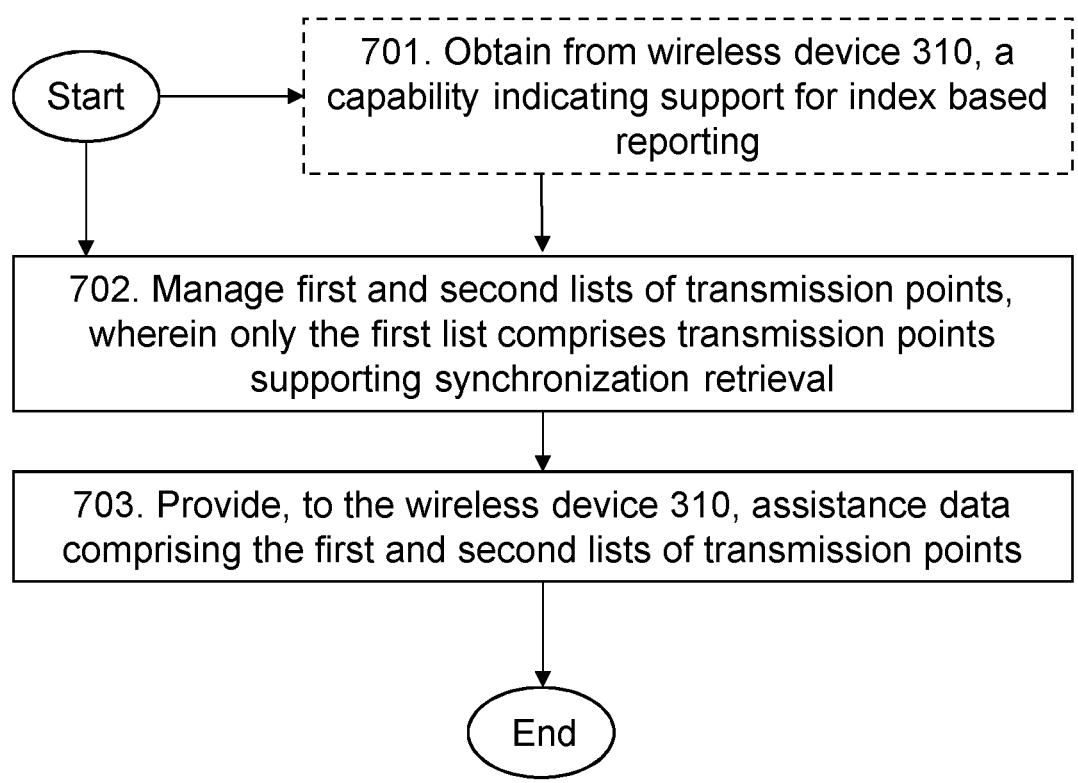
FIG. 7 is a flowchart depicting embodiments of a method performed by a network node.

An example of a method performed by the network node 302,308, e.g. the core network node 302, for index based reporting and/or transmission of data in the wireless communications network 300 will now be described with reference to a flowchart depicted in FIG. 7. As mentioned above, the method relates to index based reporting and/or transmission of data in the wireless communications network 300. Further, the method relates to mapping of received measurement information to a transmission points by means of a received index and by means of an association associating an index to a transmission point. As also previously mentioned, the core network node 302, the transmission point 308,312 and the wireless device 310 operate in the wireless communications network 300.

The methods comprise one or more of the following actions. It should be understood that these actions may be taken in any suitable order and that some actions may be combined.

Action 701

In some embodiments, the network node 302,308, e.g. the core network node 302, receives, from the wireless device 310, an indication that the wireless device 310 supports indexed based reporting. Thereby, the core network node 302 is informed about the wireless device's 310 ability to support index based reporting and of its ability to receive assistance data in a compact way using index.

As mentioned above, two or more transmission points 308,312, e.g. two or more RNNs, may be transmitting the same signal, but at mutually exclusive occasions in time and/or in frequency and are therefore considered as different transmission points and separable by the wireless device 310. The capability of being able to separate transmission points by mutually exclusive occasions may be provided by the wireless device 310 to the network node 302,308. Such two or more transmission points are assigned different indices in the assistance data. Thus, the network node 302,308 such as the core network node 302 may receive, from the wireless device 310, an indication of the wireless device's capability of being able to separate transmission points by mutually exclusive occasions. As previously mentioned, that means that the wireless device 310 is configured to identify the transmission points 308,312 transmitting the same signal but at mutually exclusive occasions in time and/or frequency.

Action 702

The network node 302,308, e.g. the core network node 302, manages a first set of transmission points and a second set of transmission points, wherein only transmission points comprised in the first set supports synchronization retrieval. This means that only the transmission points, e.g. the RNN 308 or one of more of the neighboring RNNs 312, if they are comprised in the first set may be used for synchronization among the transmission points provided in the assistance data. Alternatively, the wireless device 310 may use its serving cell supporting its communication links for synchronization.

Action 703

The network node 302,308, e.g. the core network node 302, provides assistance data to the wireless device 310, which assistance data comprises the first and second lists of transmission points. As previously mentioned, the assistance data may also comprise a respective index for each transmission point comprised in the assistance data. As previously mentioned, the indices are unique for the wireless device 310 in communication with the core network node 302.

Figure 8:
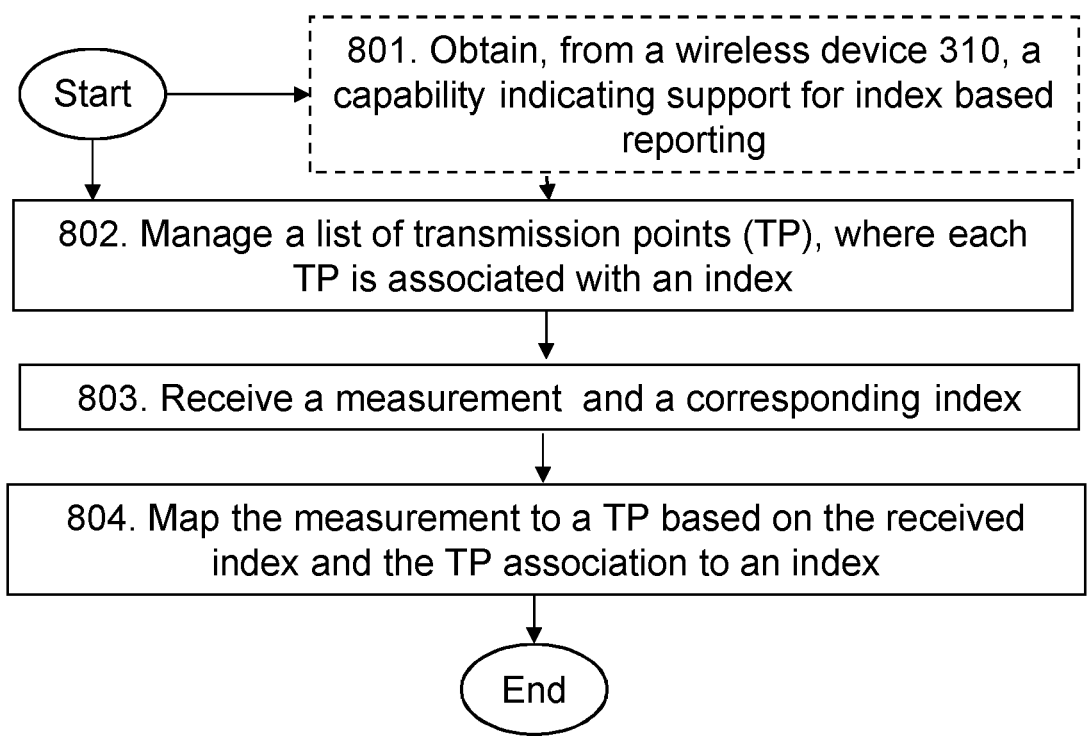
FIG. 8 is a flowchart depicting embodiments of a method performed by a network node.

An example of a method performed by the core network node 302 will now be described with reference to a flowchart depicted in FIG. 8. The method relates to index based reporting and/or transmission of data in the wireless communications network 300. Further, the method relates to mapping of received measurement information to a transmission points. As mentioned above, the core network node 302, the transmission point 308,312 and the wireless device 310 operate in the wireless communications network 300.

The methods comprise one or more of the following actions. It should be understood that these actions may be taken in any suitable order and that some actions may be combined. Further, one or more of Actions 801-804 to be described below may be combined with one or more of Actions 701-703 described above.

Action 801

The network node 302,304, e.g. the core network node 302 such as the location server, may obtain, from the wireless device 310, a capability indicating support for index based reporting. Thus, the core network node 302 obtains, from the wireless device 310, an indication indicating the wireless device's 310 capability of supporting index based reporting of measurement information.

Further, the network node 302,308 may receive, from the wireless device 310, an indication of the wireless device's capability of being able to separate transmission points by mutually exclusive occasions. This means that, the core network node 302 may receive, from the wireless device 310, an indication of the wireless device's 310 capability of being able to separate transmission points 308,312 transmitting the same signal but at mutually exclusive occasions in time and/or frequency.

Action 802

The network node 302,304, e.g. the core network node 302 such as the location server, manages a list of transmission points 308,312, wherein each transmission point is associated to an index. According to some embodiments, the index provides a compact representation. In other words, the core network node 302 manages at least one set of transmission points 308,312, wherein each transmission point 308,312 is associated with a respective index. For example, the respective index is only valid between the wireless device 310 and the core network node 302, and the core network node 302 may transmit, to the wireless device 310, the respective index in assistance data.

The respective index may be one or more out of:
a transmission point index unique for each transmission point 308,312 within a cell;
an index related to a beacon identity;
an index of a transmission point 308,312 within a cell, which transmission point 308,312 is capable of transmitting positioning reference signals;
a measurement index in the set of transmission points 308,312; and
an identity used to generate a positioning reference signal from the transmission point, which index, identity or parameter is different from the cell identity.

In some embodiments, the core network node 302 manages the at least one set of transmission points 308,312, by managing (cf. Action 702 above) a first set of transmission points 308,312 and a second set of transmission points 308,312. In such embodiments, the first set of transmission points 308,312 comprises only transmission points 308,312 supporting retrieval of synchronization information. Such embodiments also comprises that the core network node 302 provides (cf. Action 703 above), to the wireless device 310, assistance data comprising the first and second sets of transmission points 308,312.

Action 803

The network node 302,304, e.g. the core network node 302 such as the location server, receives a measurement and a related index. The core network node 302 receives, from the wireless device 310, measurement information and an index Further, in Action 804 the network node 302,304, e.g. the core network node 302 such as the location server, maps the measurement to a transmission point based on the received index and the transmission point association to an index. In other words, the core network node 302 maps the measurement information to the transmission point 308,312 based on the received index and an association, which association associates a transmission point to an index that is unique for the wireless device 310.

Figure 9:
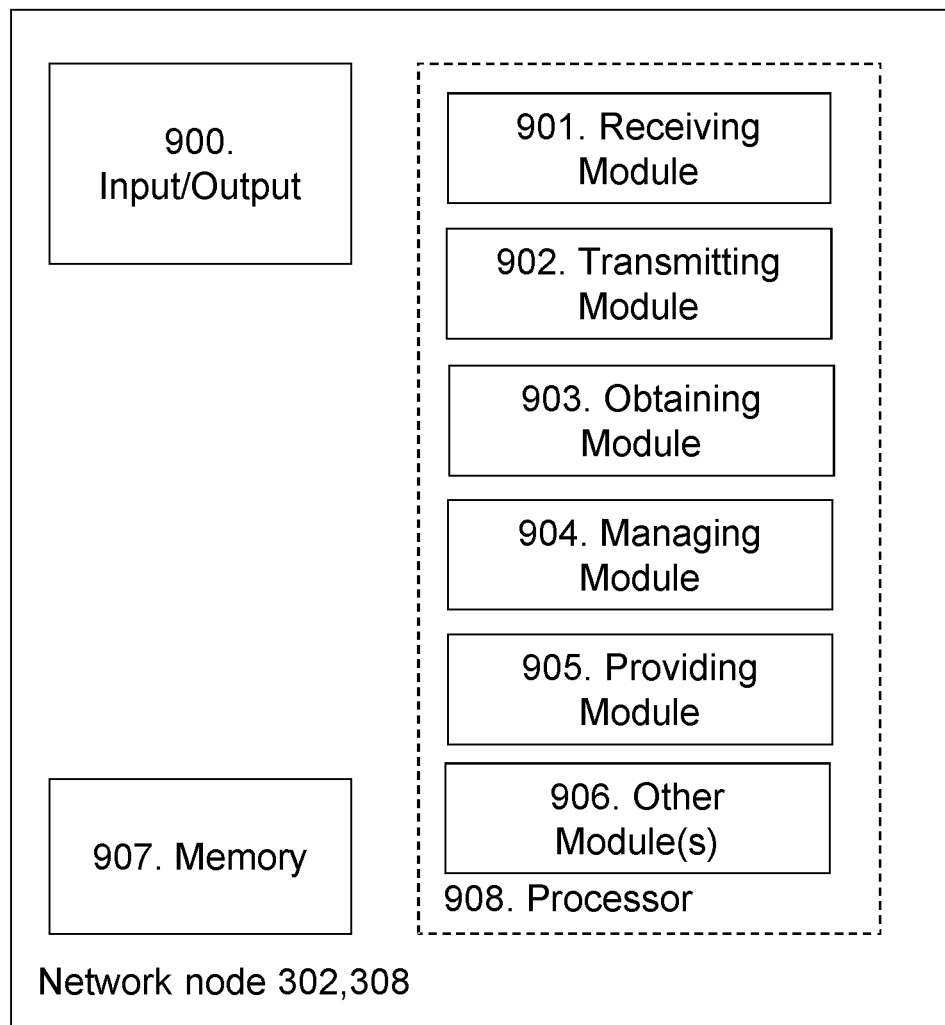
FIG. 9 is a schematic block diagram illustrating embodiments of a network node.

To perform the method in the wireless communications network, the network node 302,308, e.g. the core network node 302, may be configured according to an arrangement depicted in FIG. 9. The method relates to index based reporting and/or transmission of data in the wireless communications network 300. Further, the method relates to mapping of received measurement information to a transmission points. As previously described, the core network node 302, the transmission point 308,312, and the wireless device 310 are configured to operate in the wireless communications network 300.

In some embodiments, the network node 302,308, e.g. the core network node 302, comprises an input and/or output interface 900 configured to communicate with one or more wireless devices, e.g. the wireless device 310 and/or with one or more other network nodes, e.g. the core network node 302, or with the transmission point 308,312 such as the RNN 308 and/or one or more neighbouring RNNs 312. The input and/or output interface 900 may comprise a wireless receiver (not shown) and a wireless transmitter (not shown).

The network node 302,308, e.g. the core network node 302, is configured to receive, e.g. by means of a receiving module 901 configured to receive, a transmission, e.g. a data packet, a signal or information, from one or more wireless devices, e.g. the wireless device 310 and/or from one and/or more other network nodes, e.g. from the core network node 302 or from the transmission point 308,312 e.g. from the RNN 308 and/or from one or more neighbouring RNNs 312. The receiving module 901 may be implemented by or arranged in communication with a processor 908 of the network node 302,308 such as the core network node 302. The processor 908 will be described in more detail below.

The core network node 302 is configured to receive, from the wireless device 310, measurement information and an index.

In some embodiments, the network node 302,308, e.g. the core network node 302, receives, from the wireless device 310, an indication that the wireless device 310 supports indexed based reporting.

Further, the network node 302,308, e.g. the core network node 302, may receive, from the wireless device 310, an indication of the wireless device's capability of being able to separate transmission points by mutually exclusive occasions. In other words, the core network node 302 may be configured to receive, from the wireless device 310, an indication of the wireless device's 310 capability of being able to separate transmission points 308,312 transmitting the same signal but at mutually exclusive occasions in time and/or frequency.

The network node 302,308, e.g. the core network node 302, is configured to transmit, e.g. by means of a transmitting module 902 configured to transmit, a transmission, e.g. a data packet, a signal or information, to the wireless device 310 and/or to one or more other network nodes, e.g. the core network node 302 or the transmission point such as the RNN 308 and/or to one or more neighbouring RNNs 312. The transmitting module 902 may be implemented by or arranged in communication with the processor 908 of the network node 302,308 such as the core network node 302.

In some embodiments, the core network node 302 is configured to transmit indices associated to a respective transmission point 308,312 to the wireless device 310. The indices may be transmitted in assistance data. As previously mentioned, the respective index is only valid between the wireless device 310 and the core network node 302. The respective index may be one or more out of:

a transmission point index unique for each transmission point 308,312 within a cell;

an index related to a beacon identity;

an index of a transmission point 308,312 within a cell, which transmission point 308,312 is capable of transmitting positioning reference signals;

a measurement index in the set of transmission points 308,312; and an identity used to generate a positioning reference signal from the transmission point, which index, identity or parameter is different from the cell identity.

The network node 302,308, e.g. the core network node 302, may be configured to obtain, e.g. by means of an obtaining module 903 configured to obtain, an indication from the wireless device 310. The indication indicates that the wireless device 310 supports index based reporting The obtaining module 903 may be implemented by or arranged in communication with the processor 908 of the network node 302,308 such as the core network node 302.

For example, the network node 302,308 may obtain, from the wireless device 310, a capability indicating support for index based reporting.

In other words, the core network node 302 may be configured to obtain, from the wireless device 310, an indication indicating the wireless device's 310 capability of supporting index based reporting of measurement information.

The network node 302,308, e.g. the core network node 302, is configured to manage, e.g. by means of a managing module 904 configured to manage, one or more lists of transmission points. The managing module 904 may be implemented by or arranged in communication with the processor 908 of the network node 302,308.

In other words, the core network node 302 is configured to manage at least one set of transmission points 308,312. Each transmission point 308,312 is associated with a respective index.

For example, the network node 302,308 manages first and second lists of transmission points, wherein only the first list comprises transmission points supporting synchronization retrieval. In other words, the core network node 302 is configured to manage the at least one set of transmission points 308,312, by being configured to manage a first set of transmission points 308,312 and a second set of transmission points 308,312, wherein the first set of transmission points 308,312 comprises only transmission points 308,312 supporting retrieval of synchronization information.

The network node 302,308, e.g. the core network node 302, is configured to provide, e.g. by means of a providing module 905 configured to provide, data, such as assistance data, to the wireless device 310. The providing module 905 may be implemented by or arranged in communication with the processor 908 of the network node 302,308.

The network node 302,308 may be configured to provide the wireless device 310 with assistance data comprising one or more of the at least one lists of transmission point.

For example, the network node 302,308 may provide, to the wireless device 310, assistance data comprising the first and second lists of transmission points.

In other words, the core network node 302 may be configured to provide, to the wireless device 310, assistance data comprising the first and second sets of transmission points 308,312.

In some embodiments, the network node 302,308, e.g. the core network node 302, is configured to perform, by means of one or more other modules 906 configured to perform one or more further actions described herein. The one or more other modules may be implemented by or arranged in communication with the processor 908 of the network node 302,308.

For example, the core network node 302 is configured to map the measurement information to a transmission point 308,312 based on the received index and an association, which association associates a transmission point to an index that is unique for the wireless device 310.

The network node 302,308, e.g. the core network node 302, may also comprise means for storing data. In some embodiments, the network node 302,308 comprises a memory 907 configured to store the data. The data may be processed or non-processed data and/or information relating thereto. The memory 906 may comprise one or more memory units. Further, the memory 906 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node 302,308.

Embodiments may be implemented through one or more processors, such as the processor 908 in the arrangement depicted in FIG. 9, together with computer program code for performing the functions and/or method actions of embodiments herein. Embodiments relate to index based reporting and/or transmission of data in the wireless communications network 300. Further, embodiments relate to mapping of received measurement information to a transmission points. The program code mentioned above may also be provided as a computer program product, for instance in the form of a data carrier carrying computer program code for performing the embodiments herein when being loaded into the network node 302,308. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the network node 302,308.

Those skilled in the art will also appreciate that the input/output interface 900, the receiving module 901, the transmitting module 902, the obtaining module 903, the managing module 904, the providing module 905, the one or more other modules 906 above may refer to a combination of analogue and digital circuits, and/or one or more processors configured with software and/or firmware, e.g. stored in the memory 907, that when executed by the one or more processors such as the processors in the network node 302,308 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Synchronization Retrieval

Figure 4:
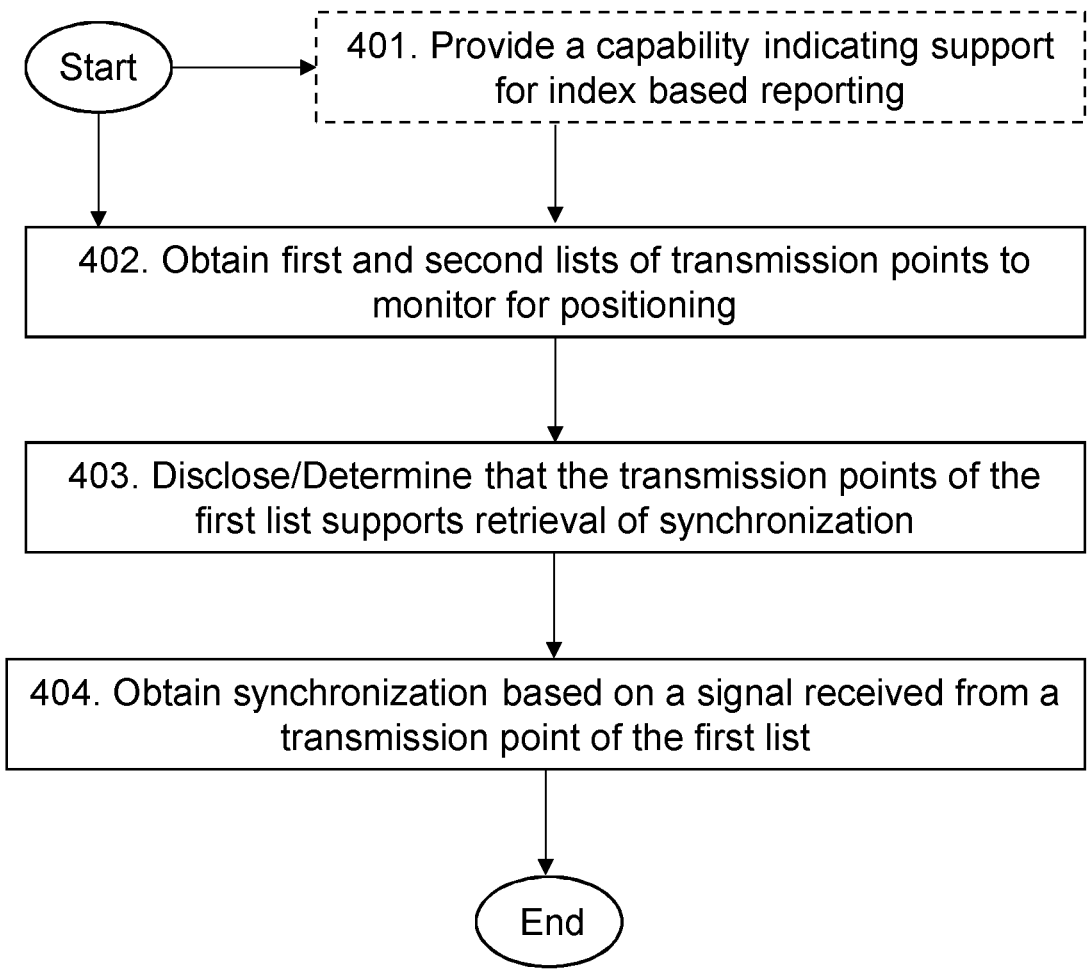
FIG. 4 is a flowchart depicting embodiments of a method performed by a wireless device.

In Action 402 of FIG. 4, the wireless device 310 receives first and second lists of transmission points to monitor for positioning. As previously mentioned, one of the first and second lists, e.g. the first list, comprises transmission points supporting synchronization retrieval, e.g. retrieval of synchronization information. In Action 403, the wireless device 310 determines that transmission points of the first list supports retrieval of synchronization information. In Action 404, the wireless device 310 obtains synchronization based on a signal from a transmission point from the first list. In some embodiments, the wireless device 310 obtains subframe synchronization based on a Primary Synchronization Signal (PSS) and a Secondary Synchronization Signal (SSS). Furthermore, frame synchronization may be obtained by decoding the system information at the physical broadcast channel (Master Information Block (MIB)) to retrieve the system frame number (SFN). Decoding of the Physical Broadcast CHannel (PBCH) is supported by the Common Reference Signal (CRS). The wireless device 310 may only expect the PSS, SSS, CRS and PBCH from transmission points/cells at the first list. In an alternative embodiment, for example when the first list is empty, the wireless device 310 may obtain synchronization from a serving cell providing communication services for the wireless device 310.

Indexed-Based Compact Reporting

The indexed based reporting also enables a compact representation of the assistance data information, as well as the signal measurement information. When representing a transmission point, e.g. the RNN 308 or a neighbouring RNN 312, it may be represented by at least a locally unique identifier. One example is a transmission point ID that is unique among transmission points locally sharing the same PCI. One example is a transmission point ID of 0-4095 (12 bits) and the PCI 0-503 (9 bits), in total 21 bits per transmission point. An alternative is to associate each entry in the list of transmission points provided as assistance data to the wireless device 310 with an index. For example, if the neighbour list in the assistance data can include 3 times 24 transmission points, then an index with range 1-72 is sufficient, which requires 7 bits per transmission point.

In one example, the index is a transmission point index within a cell. In another example, the index is related to a beacon identity. A beacon may be a positioning beacon device transmitting positioning signals but not general cell-based signals. The positioning signals may be Positioning Reference Signals (PRSs), and sometimes in this disclosure the terms position signal and PRS are used interchangeably.

In another example, the index is an index of a positioning-signal capable transmission point within a cell, e.g., a fewer number of transmission points may be transmitting PRS within a cell than the total number of transmission points in the cell.

In another example, the index is representing an agreement between a wireless device, e.g. the wireless device 310, and the network node 302,308, e.g. the core network node 302 such as the location server, to separate different PRS transmitters, e.g. different transmitting points 308,312 transmitting PRS. A different wireless device may have a different agreement with the network node 302,308, e.g. the core network node 302 such as the location server, about indices.

In yet another example, the reference cell is also associated to an index. The index may be explicitly included in the assistance data. The index may also be implicitly defined to a specific index. One example of such an index is 0, which is unique in the assistance data and measurement reporting if neighbours are associated to different indices, for example 1 . . . 72.

In yet another example, the index is a measurement index in the list. In yet another example, the index is an index or identity or parameter used to generate a positioning signal from the transmission point, wherein the index is different from cell identity.

Assistance Data Signalling

The more compact OTDOA assistance data needs to be represented in information elements over the LTE Positioning Protocol (LPP). The new OTDOA assistance data for neighbour information may be represented as:

```
-- ASN1START
    OTDOA-NeighbourCellInfoList ::= SEQUENCE (SIZE (1..maxFreqLayers)) OF OTDOA-NeighbourFreqInfo
    OTDOA-NeighbourFreqInfo ::= SEQUENCE (SIZE (1..24)) OF OTDOA-NeighbourCellInfoElement
    OTDOA-NeighbourCellInfoList-r14 ::= SEQUENCE (SIZE (1..maxFreqLayers)) OF OTDOA-NeighbourFreqInfo-r14
    OTDOA-NeighbourFreqInfo-r14 ::= SEQUENCE (SIZE (1..24)) OF OTDOA-NeighbourCellInfoElement-r14
    OTDOA-NeighbourCellInfoElement ::= SEQUENCE {
                physCellId                          INTEGER (0..503),
                cellGlobalId                        ECGI        OPTIONAL,   -- Need ON
                earfcn                              ARFCN-ValueEUTRA        OPTIONAL,   -- Cond NotSameAsRef0
                cpLength                            ENUMERATED {normal, extended, ...}
                                                                OPTIONAL,   -- Cond NotSameAsRef1
                prsInfo                             PRS-Info
                                                                OPTIONAL,   -- Cond NotSameAsRef2
                antennaPortConfig                   ENUMERATED {ports-1-or-2, ports-4, ...}
                                                                OPTIONAL,   -- Cond NotsameAsRef3
                slotNumberOffset                    INTEGER (0..19)
                        OPTIONAL,   -- Cond NotSameAsRef4
                prs-SubframeOffset                  INTEGER (0..1279)
                        OPTIONAL,   -- Cond InterFreq
                expectedRSTD                        INTEGER (0..16383),
                expectedRSTD-Uncertainty            INTEGER (0..1023),
                ...,
                [[ earfcn-v9a0                      ARFCN-ValueEUTRA-v9a0
                        OPTIONAL    -- Cond NotSameAsRef5
                ]],
                [[ neigborIndex-r14                 INTEGER (1..72)
                        OPTIONAL    -- Cond IndexReporting
                ]]
    }
    OTDOA-NeighbourCellInfoElement-r14 ::= SEQUENCE {
                neighborIndex-r14                   INTEGER (1..72),
                earfcn                              ARFCN-ValueEUTRA        OPTIONAL,   -- Cond NotSameAsRef0
                cpLength                            ENUMERATED {normal, extended, ...}
                                                                OPTIONAL,   -- Cond NotSameAsRef1
                prsInfo                             PRS-Info,
                antennaPortConfig                   ENUMERATED {ports-1-or-2, ports-4, ...}
                                                                OPTIONAL,   -- Cond NotsameAsRef3
                slotNumberOffset                    INTEGER (0..19)
                        OPTIONAL,   -- Cond NotSameAsRef4
                prs-SubframeOffset                  INTEGER (0..1279)
                        OPTIONAL,   -- Cond InterFreq
                expectedRSTD                        INTEGER (0..16383),
                expectedRSTD-Uncertainty            INTEGER (0..1023),
                ...
    }
    maxFreqLayers INTEGER ::= 3
-- ASN1STOP
```

The assistance data concerning OTDOA neighbours is in some embodiments represented by two lists of transmission points/cells, OTDOA-NeighbourFreqInfo and OTDOA-NeighbourFreqInfo-v14. A first list of transmission points similar to the existing list with extensive information about each transmission point/cell such as the physicalCellIdentity the globally unique E-UTRAN Cell Global Identifier (ECGI), and PRS configurations. The provided information per list item enables the wireless device to use the transmission point/cell to retrieve synchronization. Optionally, each item can be associated with an index, the neighborindex.

The second list of transmission points comprises more limited information, where each item comprises an index, neighborindex and PRS configuration. This information is NOT sufficient to enable the wireless device 310 to retrieve synchronization from the transmission point/cell.

Note that the index is mandatory in the new OTDOA assistance data OTDOA-NeighbourFreqInfo-r14, and optional in the existing OTDOA assistance data OTDOA-NeighbourFreqInfo. This is described via a conditional presence defined as IndexReporting. The use of two lists of transmission points means that it is possible to inform the wireless device 310 about what cells/transmission points that provide additional signals and information, for example to retrieve SFN, Public Land Mobile Network (PLMN), System Information (SI) etc. (part of the legacy list), and what cells/transmission points that do not (part of the Rel. 14 list). In addition, the wireless device 310 may obtain the additional signals from its serving cell, supporting existing communication services.

The proposal is to introduce a second list of elements, where both the second and the existing first list of transmission points are limited to 3×24 elements. However, in order not to increase the storage and handling requirements for the wireless device 310, it is proposed to limit the combined total of the number of elements in these two lists to 3×24 neighbours. Furthermore, the network node 302,308, e.g. the core network node 302 such as the location server, ensures that the different indices in the combined lists are unique.

The second list is therefore introduced with the informative note "The number of elements in the OTDOA-NeighbourCellInfoList and OTDOA-NeighbourCellInfoList-r14 lists in total does not exceed 3×24 elements."

The PRS Info includes the PRS configuration, and may be included in items in either of the two lists.

```
-- ASN1START
PRS-Info ::= SEQUENCE {
    prs-Bandwidth           ENUMERATED { n6, n15, n25, n50, n75, n100, ... },
    prs-ConfigurationIndex  INTEGER (0..4095),
    numDL-Frames            ENUMERATED {sf-1, sf-2, sf-4, sf-6, ...},
    ...,
    prs-MutingInfo-r9       CHOICE {
        po2-r9                  BIT STRING (SIZE(2)),
        po4-r9                  BIT STRING (SIZE(4)),
        po8-r9                  BIT STRING (SIZE(8)),
        po16-r9                 BIT STRING (SIZE(16)),
        ...,
        [[      prsID-r14    INTEGER (0..4095)
        OPTIONAL            -- Cond PRSID
        ]]
    }                       OPTIONAL      -- Need OP
}
-- ASN1STOP
```

The condition PRSID means that the field is present for the new neighbour elements that are included in the OTDOA_neighborCellInfoElement-r14, where transmitters, e.g. transmission points 308,312, in the assistance data are defined using the PRS ID, and not the PCI. In case the field is included for a reference cell or a legacy neighbour element, the field is optional.

Reference Cell

The reference cell may be represented by the existing assistance data. Typically, the reference cell is the serving cell. The existing information enables retrieval of t/f synchronization, SFN etc. However, since the wireless device 310 subject to positioning is in connected mode and is monitoring t/f synchronization and SFN via its serving cell, it seems unnecessary to repeat such information for the reference cell as well. Therefore, and alternative is to assume that the wireless device 310 is maintaining SFN and t/f synchronization from its serving cell without the need of support from any information in the OTDOA assistance data.

Therefore, the PCI and ECGI can be excluded in the reference cell definition in the assistance data

```
-- ASN1START
OTDOA-ProvideAssistanceData ::= SEQUENCE {
    otdoa-ReferenceCellInfo         OTDOA-ReferenceCellInfo
        OPTIONAL,    -- Need ON
    otdoa-NeighbourCellInfo         OTDOA-NeighbourCellInfoList
        OPTIONAL,    -- Need ON
    otdoa-Error                     OTDOA-Error
        OPTIONAL,    -- Need ON
    ...,
    [[    otdoa-ReferenceCellInfo-r14
                                    OTDOA-
ReferenceCellInfo-r14    OPTIONAL    -- Cond Ref
    ]]
    [[    otdoa-NeighbourCellInfo-r14
                                    OTDOA-
NeighbourCellInfoList-r14    OPTIONAL    -- Need ON
    ]]
}
-- ASN1STOP
-- ASN1START
OTDOA-ReferenceCellInfo-r14 ::= SEQUENCE {
    earfcnRef                       ARFCN-ValueEUTRA
OPTIONAL,        -- Cond NotSameAsServ0
    antennaPortConfig               ENUMERATED {ports1-or-2, ports4,
... }
            OPTIONAL,            -- Cond NotSameAsServ1
    cpLength                        ENUMERATED { normal,
extended, ... },
    prsInfo                         PRS-Info
        OPTIONAL,            -- Cond PRS
    ...,
    [[ earfcnRef-v9a0               ARFCN-ValueEUTRA-v9a0
    OPTIONAL        -- Cond NotSameAsServ2
    ]]
}
-- ASN1STOP
```

The new reference cell info IE is conditionally present, since it may only be included if the existing reference cell info IE is not.

Signal Measurement Information

Analysing the needs regarding the signal measurement reporting, it is important to support the different enhancements for same PCI and PRS-based TBS, but also to consider the efficiency of the representation in case use cases will be based on relatively frequent measurement reporting for positioning.

The combination PCI+ transmission point ID is not supporting the PRS-based beacons since it lacks a PCI, nor is it signalling efficient since more bits are needed to identify a neighbour. Instead, the approach based on indices is more attractive since it supports both same PCI and PRS-based TBS while providing a more efficient signalling. While the transmission point ID solution may exist on LPPa between a RNN 308 and the location server for purposes such as muting pattern assignment, the wireless device 310 may be unobservant to the transmission point ID definition between the RNN 308 and the core network node 302, e.g. the location server.

In the proposed new OTDOA assistance data, neighbours, e.g. neighbouring RNNs 312, are assigned an index between 1 and 72. Furthermore, in one embodiment, the proposed reference cell of the OTDOA assistance data may be assigned index 0 to enable that the wireless device 310 may change the reference cell, and therefore needs to explicitly indicate the reference cell in the signal measurement information.

The OTDOA signal measurement information may be represented as below in one embodiment. In summary, it is proposed to introduce a new neighbour measured list, while also maintaining support a mix of cell configurations. Each item in the list comprises the index from the assistance data, and the measurement information.

```
-- ASN1START
OTDOA-SignalMeasurementInformation ::= SEQUENCE {
    systemFrameNumber           BIT STRING (SIZE (10)),
    physCellIdRef               INTEGER (0..503),
    cellGlobalIdRef                 ECGI             OPTIONAL,
    earfcnRef                       ARFCN-ValueEUTRA OPTIONAL,
                                -- Cond NotSameAsRef0
    referenceQuality            OTDOA-MeasQuality,       OPTIONAL,
    neighbourMeasurementList    NeighbourMeasurementList,
    ...,
    [[ earfcnRef-v9a0           ARFCN-ValueEUTRA-v9a0   OPTIONAL
-- Cond NotSameAsRef1
    ]]
}
OTDOA-SignalMeasurementInformation-r14 ::= SEQUENCE {
    systemFrameNumber           BIT STRING (SIZE (10)),
    neighborIndex-r14           INTEGER (0..72),
    referenceQuality            OTDOA-MeasQuality       OPTIONAL,
    neighbourMeasurementList-r14    NeighbourMeasurementList-r14  OPTIONAL
    ...
}
NeighbourMeasurementList ::= SEQUENCE (SIZE(1..24)) OF NeighbourMeasurementElement
NeighbourMeasurementList-r14 ::= SEQUENCE (SIZE(1..24)) OF NeighbourMeasurementElement-r14
NeighbourMeasurementElement ::= SEQUENCE {
    physCellIdNeighbour         INTEGER (0..503),
    cellGlobalIdNeighbour           ECGI             OPTIONAL,
    earfcnNeighbour                 ARFCN-ValueEUTRA OPTIONAL,
                                -- Cond NotSameAsRef2
    rstd                        INTEGER (0..12711),
    rstd-Quality                OTDOA-MeasQuality,
    ...,
    [[ earfcnNeighbour-v9a0     ARFCN-ValueEUTRA-v9a0 OPTIONAL
-- Cond NotSameAsRef3
    ]]
}
NeighbourMeasurementElement-r14 ::= SEQUENCE {
    neighborIndex-r14           INTEGER (0..72),
    rstd                        INTEGER (0..12711),
    rstd-Quality                OTDOA-MeasQuality,
    ...
}
-- ASN1STOP
```

New UE OTDOA Capability

There is also the need for wireless device's 310 capability handling in relation to the new OTDOA assistance data and signal measurement information. Essentially, there are three capability indications needed:

prsId-r14. Support for the PRS sequences generated based on PRS ID mutingPatternSeparation-r14. Support for separation of different transmission points configured with the same PRS but mutually different muting patterns indexReporting-r14. Support for index based assistance data and signal measurement information handling

```
-- ASN1START
OTDOA-ProvideCapabilities ::= SEQUENCE {
    otdoa-Mode                      BIT STRING { ue-assisted (0) } (SIZE (1..8)),
    ...,
    supportedBandListEUTRA          SEQUENCE (SIZE (1..maxBands))
        OF SupportedBandEUTRA       OPTIONAL,
    supportedBandListEUTRA-v9a0     SEQUENCE (SIZE (1..maxBands))
        OF SupportedBandEUTRA-v9a0
        OPTIONAL,
        interFreqRSTDmeasurement-r10        ENUMERATED { supported }
                                            OPTIONAL,
        additionalNeighbourCellInfoList-r10 ENUMERATED { supported }
                                            OPTIONAL,
        prsId-r14                           ENUMERATED
    { supported }                           OPTIONAL
        mutingPatternSeparation-r14         ENUMERATED { supported }
                                            OPTIONAL
        indexReporting-r14                  ENUMERATED {
    supported }                             OPTIONAL
```

```
    }
    maxBands INTEGER ::= 64
    SupportedBandEUTRA ::= SEQUENCE {
        bandEUTRA                           INTEGER
(1..maxFBI)
    }
    SupportedBandEUTRA-v9a0 ::=             SEQUENCE {
        bandEUTRA-v9a0                      INTEGER
(maxFBI-Plus1..maxFBI2)                     OPTIONAL
    }
    maxFBI                                  INTEGER
    ::= 64    -- Maximum value of frequency band indicator
    maxFBI-Plus1                            INTEGER ::= 65  -- lowest
value extended FBI range
    maxFBI2                                 INTEGER ::=
256  -- highest value extended FBI range
    -- ASN1STOP
```

Example of Indexed-Based Compact Reporting

Consider the following three transmission points; TP 17, TP 2096, TP 3978, one transmission point e.g. the TP 17, being a PRS based TBS, and the other two transmission points e.g. the TP 2096, TP 3978, having the same PCI ID but two different muting patterns.

| | | | |
|---|---|---|---|
| TP 17   | PRS ID 3000 | No PCI | (a PRS based TBS) |
| TP 2096 | PRS ID 10   | PCI 10 | muting pattern 1 |
| TP 3978 | PRS ID 10   | PCI 10 | muting pattern 2 (orthogonal to muting pattern 1) |

The index-based compact reporting assign different indices in the assistance data and these indices are used in the report to separate the transmission points. Thus, the index-based compact reporting assign different indices in the assistance data transmitted from the core network node 302 to the wireless device 310 and these indices are used by the wireless device 310 in the report to the core network node 302 in order to separate the transmission points from each other. Note that what is important is that the network node 302,304, e.g. the core network node 302 such as the location server, and the wireless device 310 has the same understanding about the indices. Below there are two sets of assistance data sent from the network node 302,304, e.g. the core network node 302 such as the location server, to two different wireless devices with the index-based compact reporting method.

UE1, e.g. the wireless device 310, is provided with the following neighbours in the assistance data:

| | | |
|---|---|---|
| Index 1 | PRS ID 3000 | |
| Index 2 | PRS ID 10   | muting pattern 1 |
| Index 3 | PRS ID 10   | muting pattern 2 |

UE2 is on the contrary provided with the following neighbours in the assistance data:

| | | |
|---|---|---|
| Index 1 | PRS ID 10 | muting pattern 1 |
| Index 2 | PRS ID 10 | muting pattern 2 |

Based on the above example it may be concluded that:
There is no need to use transmission point ID for separation of different neighbours, and hence the index 0-72 is enough.
Different wireless devices may have different indices for the same transmission point 308,312, the index is an understanding between a specific wireless device, e.g. the wireless device 310, and the network node 302,304, e.g. the core network node 302 such as the location server.

| Abbreviation | Explanation |
|---|---|
| UE     | User equipment |
| eNB    | Evolved Node B |
| eNodeB | Evolved Node B |
| E-SMLC | Evolved Serving Mobile Location Centre |
| LPP    | LTE Positioning Protocol |
| LPPa   | LTE Positioning Protocol Annex |
| RRC    | Radio Resource Control |
| TOA    | Time Of Arrival |
| TDOA   | Time Difference Of Arrival |
| OTDOA  | Observed Time Difference Of Arrival |
| GNSS   | Global Navigation Satellite System |

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a core network node, wherein the core network node, a transmission point and a wireless device operate in a wireless communications network, and wherein the method comprises:
   managing at least one set of transmission points;
   receiving, from the wireless device, a report including measurement information relating to a positioning reference signal transmitted from one transmission point out of the at least one set of transmission points and an index associated with the one transmission point;
   mapping the measurement information to the one transmission point based on the received index and an association, which association associates the one transmission point to a respective index that is unique for the wireless device.

2. The method of claim 1, comprising:
obtaining, from the wireless device, an indication indicating the wireless device's capability of supporting index-based reporting of measurement information.

3. The method of claim 1, comprising:
receiving, from the wireless device, an indication of the wireless device's capability of being able to separate transmission points transmitting the same signal but at mutually exclusive occasions in time and/or frequency.

4. The method of claim 1, wherein the respective index only is valid between the wireless device and the core network node, and wherein the method comprises:
transmitting, to the wireless device, the respective index in assistance data.

5. A method performed by a wireless device,
wherein the wireless device, a core network node and a transmission point operate in a wireless communications network, and
wherein the method comprises:
obtaining, from the core network node, at least one set of transmission points to monitor for positioning reference signals;
receiving, from the core network node in assistance data, information associating, for each transmission point in the set, the transmission point with a respective index;
obtaining measurement information relating to a positioning reference signal transmitted from one transmission point out of the at least one set of transmission points; and
reporting, to the core network node, the measurement information and the index associated with the one transmission point to enable the network node to map the measurement information to the one transmission point based on an association of the one transmission point to a respective index that is unique for the wireless device.

6. The method of claim 5, comprising:
providing an indication to the core network node, which indication indicates support for index-based reporting of measurement information.

7. The method of claim 5, comprising:
providing, to the core network node, an indication of the wireless device's capability of being able to separate transmission points transmitting the same signal but at mutually exclusive occasions in time and/or frequency.

8. The method of claim 5, wherein the respective index only is valid between the wireless device and the core network node.

9. A core network node, wherein the core network node, a transmission point and a wireless device are configured to operate in a wireless communications network, and wherein the core network node comprises:
manage at least one set of transmission points;
receive, from the wireless device, a report including measurement information relating to a positioning reference signal transmitted from one transmission point out of the at least one set of transmission points and an index associated with the one transmission point;
map the measurement information to the one transmission point based on the received index and an association, which association associates the one transmission point to a respective index that is unique for the wireless device.

10. The core network node of claim 9, configured to:
obtain, from the wireless device, an indication indicating the wireless device's capability of supporting index based reporting of measurement information.

11. The core network node of claim 9, configured to:
receive, from the wireless device, an indication of the wireless device's capability of being able to separate transmission points transmitting the same signal but at mutually exclusive occasions in time and/or frequency.

12. The core network node of claim 9, wherein the respective index only is valid between the wireless device and the core network node, and wherein the core network node is configured to:
transmit, to the wireless device, the respective index in assistance data.

13. A wireless device,
wherein the wireless device, a core network node and a transmission point are configured to operate in a wireless communications network, and
wherein the wireless device comprises:
a memory and one or more processors, the memory storing computer program code that is executable by the one or more processors whereby the wireless device is configured to:
obtain, from the core network node, at least one set of transmission points to monitor for positioning reference signals;
receive, from the core network node in assistance data, information associating, for each transmission point in the set, the transmission point with a respective index;
obtain measurement information relating to a positioning reference signal transmitted from one transmission point out of the at least one set of transmission points; and
report, to the core network node, the measurement information and the index associated with the one transmission point to enable the network node to map the measurement information to the one transmission point based on an association of the one transmission point to a respective index that is unique for the wireless device.

14. The wireless device of claim 13, configured to:
provide an indication to the core network node, which indication indicates support for index based reporting of measurement information.

15. The wireless device of claim 13, configured to:
provide, to the core network node, an indication of the wireless device's capability of being able to separate transmission points transmitting the same signal but at mutually exclusive occasions in time and/or frequency.

16. The wireless device of claim 13, wherein the respective index only is valid between the wireless device and the core network node.

* * * * *